United States Patent [19]
Patterson

[11] Patent Number: 6,019,216
[45] Date of Patent: Feb. 1, 2000

[54] SPRING MOUNTING BRACKET

[75] Inventor: Harold E. Patterson, Indiana, Pa.

[73] Assignee: FMC Corporation, Chicago, Ill.

[21] Appl. No.: 08/826,464

[22] Filed: Mar. 27, 1997

[51] Int. Cl.[7] .................................................. B65G 27/00
[52] U.S. Cl. ........................ 198/752.1; 198/763; 198/764
[58] Field of Search .................................... 198/763, 764, 198/759, 766, 769, 752.1

[56] References Cited

U.S. PATENT DOCUMENTS

| | | | |
|---|---|---|---|
| 2,664,995 | 1/1954 | Renner | 198/766 |
| 2,700,472 | 1/1955 | Carrier, Jr. et al. | 198/766 |
| 3,040,891 | 6/1962 | Saxe | 198/766 |
| 3,216,556 | 11/1965 | Burgess | 198/220 |
| 3,604,555 | 9/1971 | Cowper | 198/763 |
| 3,716,130 | 2/1973 | Morris | 198/763 |
| 4,260,052 | 4/1981 | Brown | 198/763 |
| 4,313,535 | 2/1982 | Carmichael | 198/766 |
| 4,356,911 | 11/1982 | Brown | 198/766 |
| 4,378,064 | 3/1983 | Brown | 198/769 |
| 4,880,106 | 11/1989 | Falconer et al. | 198/763 |

OTHER PUBLICATIONS

FMC Corporation, *Syntron BF–4 Scale Feeder*, Not Dated, 2 pages, Homer City, PA.
FMC Corporation, *Syntron Light–Capacity Electronic Vibrating Feeders*, 1994, 20 pages, U.S.A.
FMC Corporation. *The First Name in Food Handling Systems*, 1995, U.S.A.
FMC Corporation. *FMC Express Limited*, 1996, U.S.A.
FMC Corporation. *Link–Belt Model BL Vibrating Conveyors*, pp. 62–68, Not Dated.
FMC Corporation. Syntron VF Vibrating Conveyor, 1994, U.S.A.
Key Technology, Inc. *Iso–Flo "S" Conveyor*, Not Dated, pp. 84–85.
Key Technology, Inc. *Iso–Flo Smooth–Cycle Scale Feed Conveyor*, Not Dated, pp. 86–87.
Key Technology, Inc. *Iso–Flo Vibratory Conveyors*, Not Dated, pp. 48–49.

*Primary Examiner*—Christopher P. Ellis
*Assistant Examiner*—Isobel A. Parker
*Attorney, Agent, or Firm*—Rockey, Milnamow and Katz

[57] ABSTRACT

A spring support bracket for supporting a sheet metal trough intermittently on leaf springs provides an L-shaped bracket for a welding connection to a side wall and bottom wall of the sheet metal trough and a spring block extending outwardly from the vertical member of the L-shaped bracket and tilted to the vertical rearwardly of the trough. The spring block includes an aperture for receiving a fastener for connecting a leaf spring thereto so that the trough may be supported by a plurality of leaf springs arranged intermittently along the length of the trough and on opposite lateral sides of the troughs.

9 Claims, 4 Drawing Sheets

SPRING MOUNTING BRACKET

FIELD OF THE INVENTION

The present invention relates to vibratory equipment, and particularly to an improved spring connection bracket for a spring-supported vibratory conveyor.

BACKGROUND OF THE INVENTION

Vibratory conveyor devices are in widespread use in view of their versatile material-handling capabilities. Such devices typically include a generally elongated trough or bed which is vibrated by an associated drive system so that material is conveyed along the length of the trough.

A typical two-mass, vibratory conveyor of the base-excited conveyor design includes a trough structure supported on elongate springs extending from a support structure which is vibrated by an eccentric rotating mass. The vibration is transmitted to the trough through the springs. In typical constructions of two-mass vibratory conveyors, the support structure or base of the conveyor includes a pair of longitudinal base members typically constructed from heavy walled tubing or solid plate steel to obtain the desired structural characteristics, and in part to obtain the specific desired weight relationship between the trough and the support structure.

Generally, in operation, the total stroke of the vibrating conveyor is divided between the trough and the support structure, including the base members, in inverse proportion to their mass ratio. Since it is desirable to minimize the vibratory motion of the support structure to thereby facilitate isolation of the conveyor transmitted vibration to surrounding structures, the support structure, including the base members, is typically more than twice the weight of the trough structure, and in some cases, as much as eight times or more in weight. In some designs, it is often necessary to add ballast weight to the support structure in order to obtain the desired stroke of the support structure and the trough structure.

In order to maintain the required stiffness of the support structure, and to prevent unwanted torsional and vertical bending modes of the structure that may be excited at the operating frequency of the conveyor, cross-members, typically made from steel tubes, angle, or channel sections, are connected between the longitudinal base members to form a stiff ladder-like frame construction. It is common practice to connect the spring-mounting elements of the support structure at the points where these cross-members attach to the longitudinal base members to thereby take advantage of the structural support provided by the cross-members.

In the design of industrial equipment, such as the vibratory conveyors described above, it is often required to attach springs to light sheet metal structures, for example to attach the springs to spring connections on the trough structure of the vibratory conveyor.

The springs create concentrated shear and bending loads in the trough structure, particularly at the spring connections. If such shear and bending loads are excessive, premature failure of the structure at those locations is possible. Currently, spring mounting brackets comprised of metal blocks, castings, or sheet metal scab plates, are welded or bolted to the sheet metal trough to help spread the spring load along a length of the trough.

The current practice provides attachment connections reinforced for loads in one plane, and neglect loads that may occur perpendicular to that plane. Additionally, the effectiveness of trying to spread the support load by this means is limited, because the spring mounting bracket adds mass to the trough structure which results in the requirement of adding more springs to maintain a desired mass/spring ratio, and consequently further raising the load at the connection, such that the connection can fail. Thus, the number of springs at any one connection is limited by the spring mounting bracket mass. It is also evident that the cost of the trough structure increases with the requirement for more springs, and spring connecting brackets.

It would be desirable to provide a connection structure for spreading out load at the connection between a spring support and sheet metal trough which allows for more spring force, e.g., allows for more or stiffer leaf springs, at each connection without adding excessive weight at the connection, to maintain a desired mass/spring ratio. It would be desirable to provide a connection between a spring support and supported equipment which resists both bending and shear forces. It would be desirable to provide a rugged connection between a spring support and supported equipment which maximizes the number of springs that each connection point can carry, thus minimizes the number of spring brackets required and effectually minimizing the mass of the structure. It would also be desirable to provide a spring bracket which could be used with many applications, allowing for a "standardization" or a planned commonality of parts for different conveyor sizes and configurations.

SUMMARY OF THE INVENTION

The vibratory conveyor construction embodying the principles of the present invention includes an L-shaped bracket having two legs. The L-shaped bracket is mounted to a folded edge of a sheet metal trough structure such that it reinforces the trough structure in the two planes that form the edge. The bracket is connected to a spring which supports a portion of the trough. One of the two legs of the L-shaped bracket, the vertical leg, reinforces substantially against shear loads on the trough, while the other leg, the horizontal leg, reinforces substantially against the bending loads on the trough. Thus, the support load at each connection can be maximized, i.e., the number of springs at each connection can be maximized and the total number of spring brackets required for a trough length and the total mass of the structure can be effectively minimized.

The bracket thickness is preselected to spread out the spring forces to reduce both the shear and bending stress. A spring mounting block may be welded to the bracket or may be bolted onto the bracket, or a combination may be used, i.e., a spring mounting block can be first welded to a bolting plate and then bolted onto the bracket.

In accordance with the illustrated embodiments, the inventive spring brackets are utilized on a vibratory conveyor which includes a generally elongated conveyor trough along which material is conveyed. The conveyor further includes an elongated support structure extending generally beneath the conveyor bed, and a plurality of springs operatively connecting the conveyor bed to the support structure. In a "base-excited" conveyor design, a vibratory drive is operatively connected to the support structure, the vibration of which, in turn, effects vibratory motion of the conveyor trough via the plurality of springs interconnecting the trough and the support structure.

In accordance with the illustrated embodiment of the present invention, the support structure comprises a pair of laterally spaced longitudinally extending base members, and a plurality of transversely spring-mount cross-member assemblies for connecting the springs of the conveyor to the base members. In the preferred relatively lightweight configuration of the present conveyor, each of the longitudinally extending base members has a generally inwardly open, channel-like configuration, including a vertical web portion and upper and lower flange portions respectively extending from the web portion.

Each cross-member assembly further comprises a tubular cross-member joined to and extending between the base members. The tubular members connect to end plates respectively connected to inside surfaces of the web portions of the base members. Extending outwardly from the end plates are spring mounts for respectively mounting a pair of the leaf springs of the conveyor thereto. In the preferred form, each spring-mount extends through an opening in the web portion of the respective one of the base members, thus facilitating connection of the associated leaf springs generally along the outside of the laterally spaced base members.

Springs, such as stacked leaf springs, connect between the spring mounts of the base members and the inventive spring mounting blocks of the trough. In a preferred form, the leaf springs are tilted to the vertical, rearwardly.

Other features and advantages of the present invention shown will become readily apparent from the following detailed description, the accompanying drawings, and the appended claims.

DETAILED DESCRIPTION OF THE PREFERRED EMBODIMENTS

Figure 1:
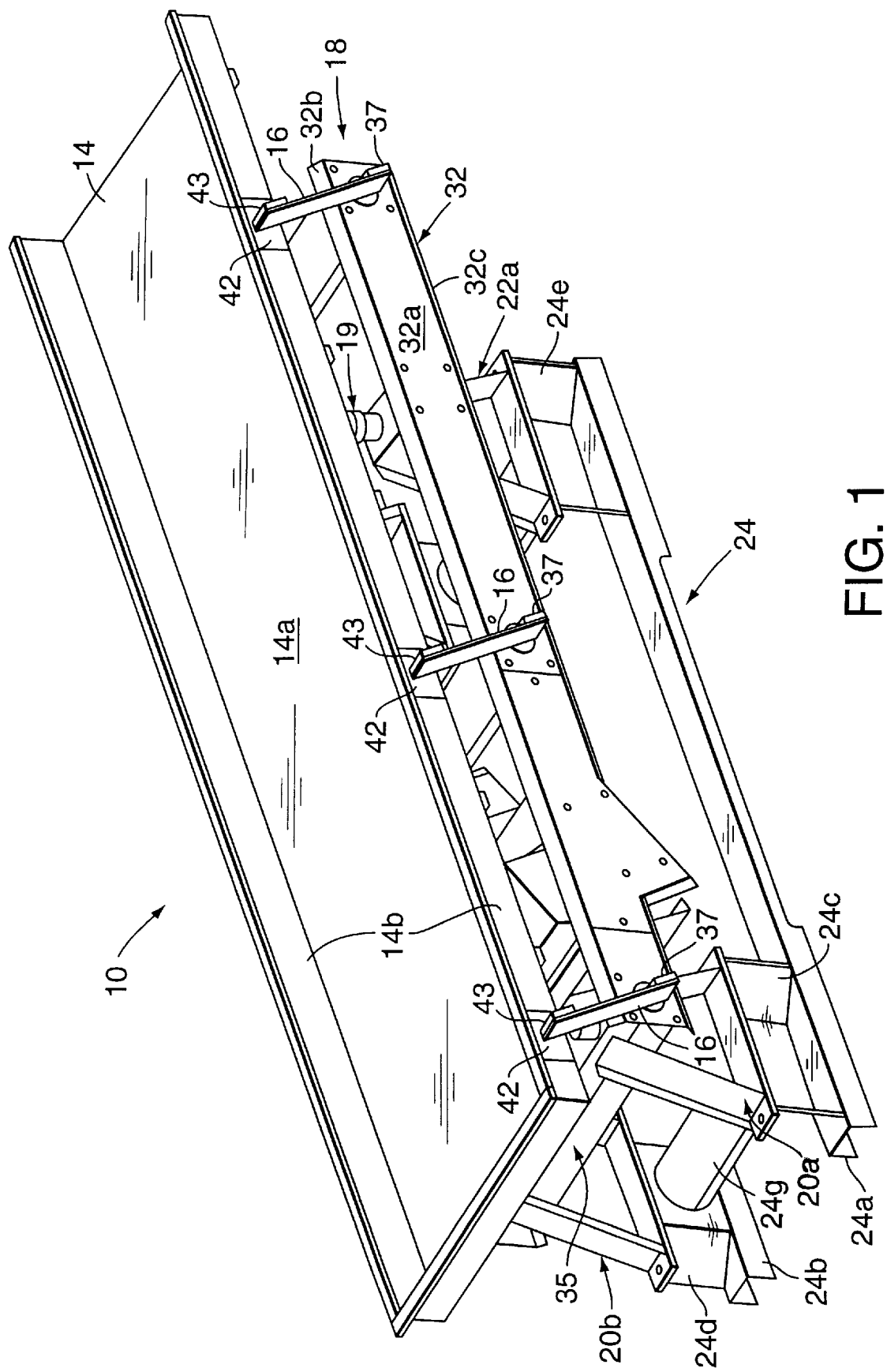
FIG. 1 is a perspective view of a conveyor incorporating the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
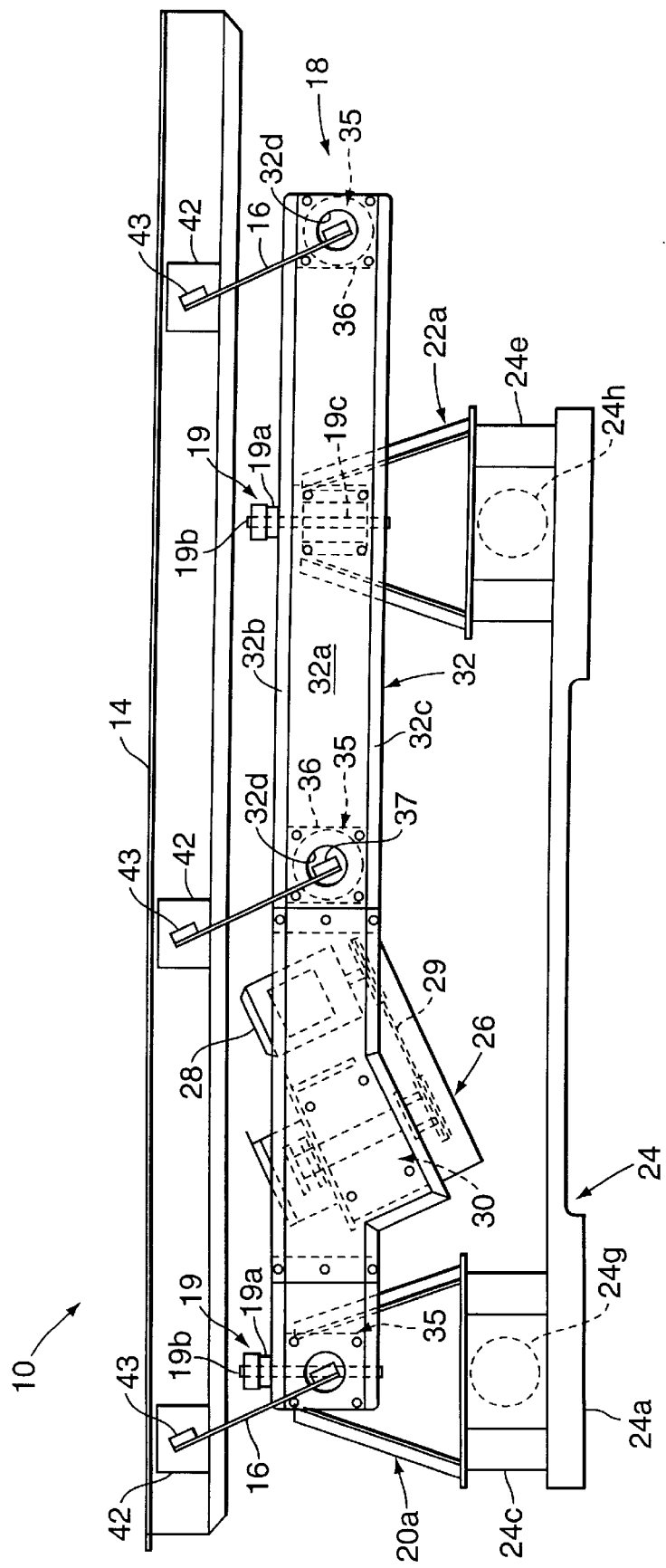
FIG. 2 is a front elevational view of the conveyor showing FIG. 1.
Figure 3:
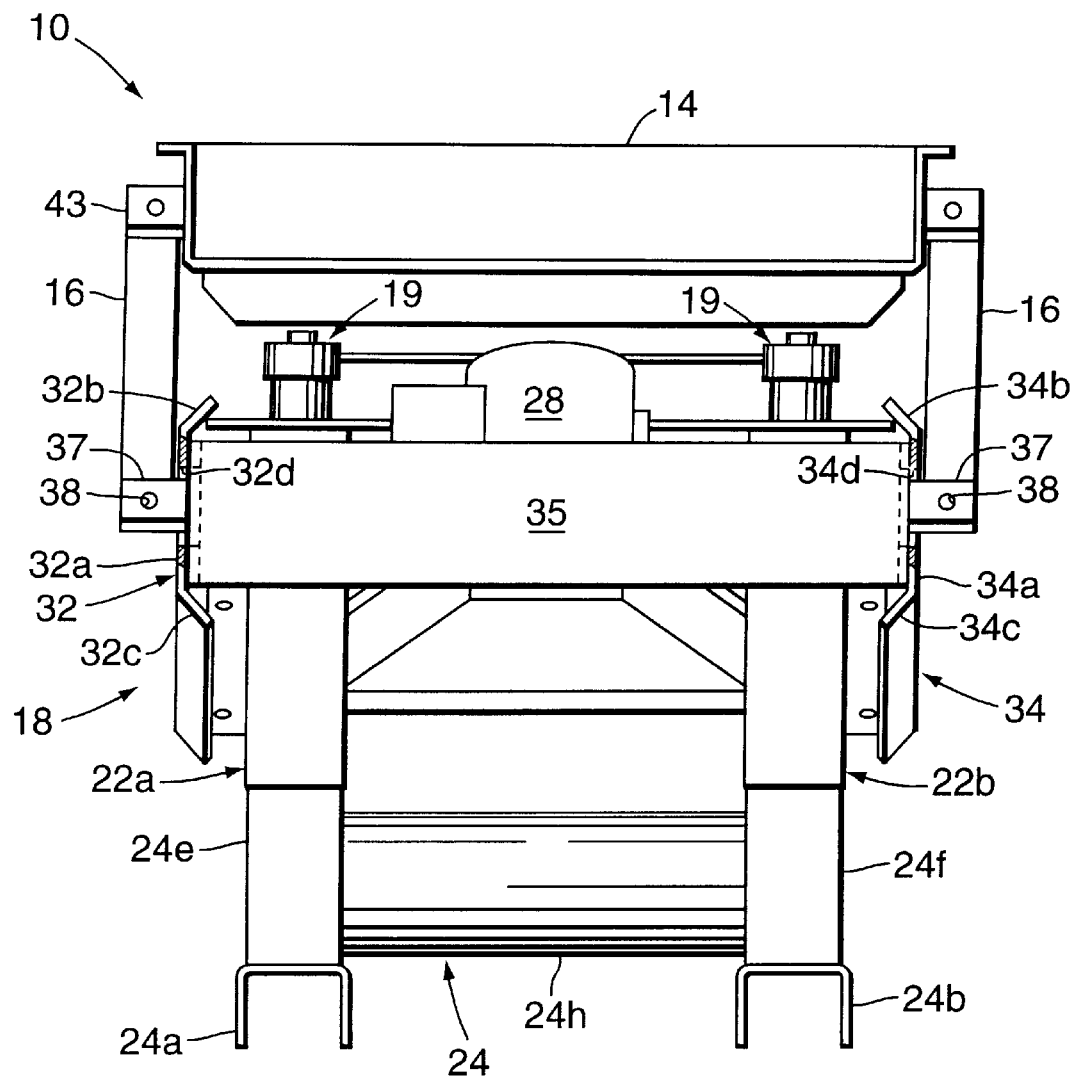
FIG. 3 is a right-side view of the conveyor shown in FIG. 2.

FIGS. 1 through 3 illustrate a trough conveyor 10 which embodies the present invention. The trough conveyor 10 includes a trough 14 mounted via a plurality of springs 16 to a base 18 which is supported via vibration "cushions" or "isolators" 19 from A-frames 20a, 20b; 22a, 22b which are supported on a mounting frame 24. The mounting frame 24 includes skids 24a, 24b, pedestals 24c, 24d, 24e, 24f, suppoprted on the skids 24a, 24b, and lateral tubular braces 24g, 24h connecting the pedestals in pairs. The isolators 19 can include elastomeric rings or blocks, or pneumatic or hydraulic dampers in combination with spring members, which support from below a flange 19a connected to a threaded rod 19b, the rod hanging the base 18 from above. The base 18 then, in effect, resiliently floats on the A-frames 20a, 20b; 22a, 22b without imparting significant vibration thereto.

Supported by the base is a vibratory drive 26 including a motor 28 driving a belt 29 which drives a linear vibratory exciter 30 which utilizes the counter rotation of eccentric weights held on counter rotating shafts (not shown) to create a linear vibration along a line. Preferably two or four eccentric weights are used.

The vibratory drive 26 is mounted to the base 18 to vibrate the base, which in turn, transmits force through the plurality of springs 16 which operatively connect the base 18 with the conveyor trough 14. In this manner, vibratory drive of the base 18 imparts material-conveying vibratory motion to the conveyor trough 14 via the springs 16. The springs 16 may each comprise one or more leaf springs. Multiple leaf springs can be arranged in stacked fashion to increase the stiffness of the spring.

The base 18 of the conveyor 10 includes a pair of laterally spaced, longitudinally extending base members 32, 34 each preferably having a generally inwardly open, channel-like configuration. As such, each of the base members 32, 34 includes a vertically oriented web portion 32a, 34a respectively, and upper and lower flanges 32b, 32c; 34b, 34c respectively extending from the web portion. The base 18 further includes a plurality of longitudinally spaced, transversely extending spring-mount cross-member assemblies 35 which extend between and are connected to the pair of laterally spaced base members 32, 34. The overall construction of the base 18 is of a generally lightweight configuration, thereby promoting operating efficiency of the conveyor structure.

Each cross-member 35 is closed at opposite ends by end plates 36 which bolt to the vertical webs 32a, 34a of the base member 32, 34. The vertical webs 32a, 34a include side holes 32d, 34d in alignment with the end closing plates 36.

Extending outwardly from each closing plate 36 at the end of each cross-member are lugs 37, each having a fastener receiving aperture 38 therethrough. The lugs 37 extend through the side holes 32d, 34d. The lugs tilt rearwardly (leftwardly in FIG. 2). A leaf spring 16 is connected by a bolt and cooperating nut (not shown) to each lug 37 at the aperture 38, and extends from each lug 37 up to the trough 14 to be connected thereto.

Each of the cross-member assemblies 35 (three being shown in the illustrated embodiment) extends between the laterally spaced base members 32, 34, with the end plates 36 of each cross-member assembly 35 respectively connected to the inwardly facing surface of the web portion 32a, 34a of the respective one of the base members 32, 34. In order to minimize distortion of the various components of the base 18, it is presently preferred that the rectangular end plates 36 of each cross-member 35 be connected to the respective one of the base members 32, 34 by a plurality of mechanical fasteners and minimum welding, if necessary.

The springs 16 thus provide the desired operative connection of the base to the conveyor trough for transmission of vibratory forces from the driver 26 through the base 18 to the conveyor trough 14. Alternatively, a vibratory driver can be physically connected to the trough 14 to excite the trough directly while the trough is supported from the leaf spring supports as described above. It is also within the scope of the present invention that the vibratory device is not limited to the device shown and described but also encompasses all mechanical, electromagnetic or other type vibratory drivers.

Welded intermittently along the trough 14 are L-shaped trough brackets 42. The trough brackets are flushly arranged against and reinforce a floor panel 14a and a side panel 14b of the trough 14. The trough brackets each have a spring mounting block 43 located substantially centrally thereof and tilted to be angularly aligned with a corresponding one of the spring mounts 35 on the base 18. The leaf spring 16 is correspondingly connected by a bolt to the mounting block 43.

Figure 4:
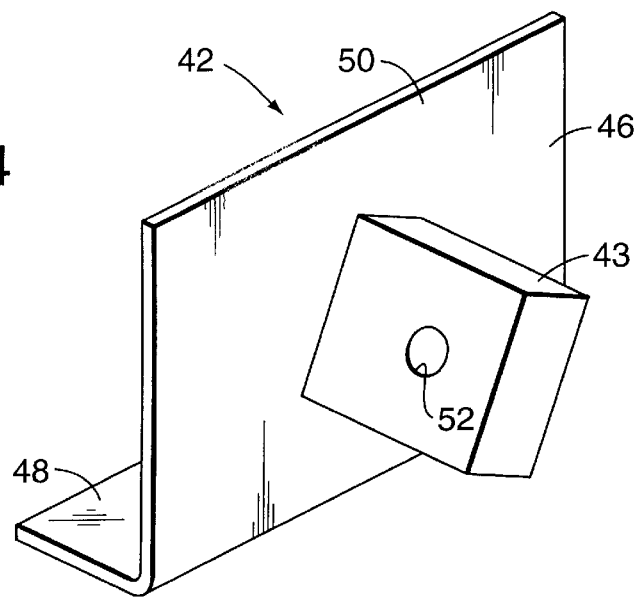
FIG. 4 is a perspective view of a spring bracket of the present invention.
Figure 5:
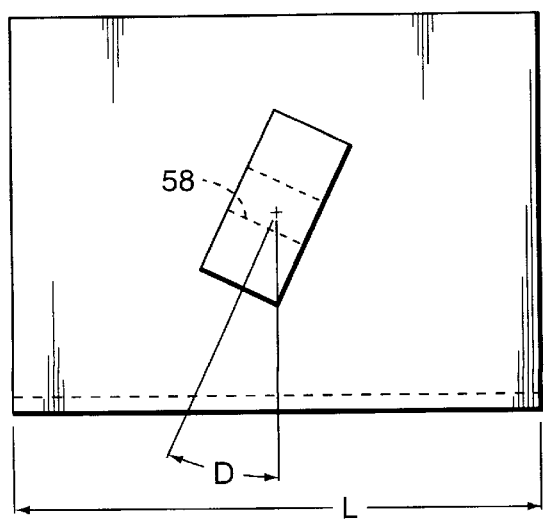
FIG. 5 is an elevational view of the spring bracket of FIG. 4.
Figure 6:
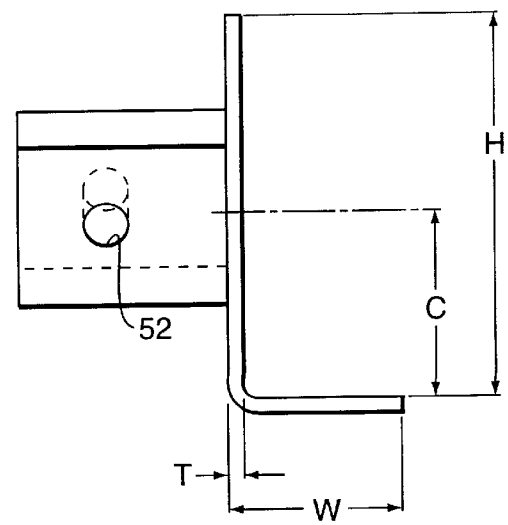
FIG. 6 is a right-side view of the bracket shown in FIG. 4.

As illustrated in FIGS. 4 through 6, the mounting bracket 42 includes an L-shaped bracket plate 46 which carries the spring-mounting block 43. The spring-mounting block 43 is tabular shaped. The spring-mounting block is welded to the bracket plate directly, or can be formed therewith, or connected to a connecting plate which is bolted or welded to the mounting bracket (not shown).

The bracket plate 42 is L-shaped with a horizontal leg 48 which underlies a bottom wall portion 14*a* of the trough 14, and a vertical leg 50 which overlies a vertical wall portion 14*b*. The horizontal leg 48 and the vertical leg 50 are welded to the bottom wall portion 14*a* and side wall portion 14*b* of the trough on outside surfaces thereof. Two parallel L-shaped welds along lateral sides of the horizontal leg 48 and the vertical leg 50 can be used to connect the bracket plate to the base 18. The L-shaped configuration provides a much improved resistance to both shear and bending in both the plane of the side wall portion 14*b* of the trough 14 as well as the plane of the bottom wall portion 14*a* of trough 14. The reinforcing is accomplished with the minimum of weight gain for the trough so that further spring force is not necessary to balance the mass of the trough with the spring constant.

In one presently preferred embodiment, the bracket has a dimension L of six inches and the dimension W of approximately one and seven-eighths inches. The dimension H is approximately four and three-eighths inches. The dimension C between the horizontal leg 48 and an aperture 52 for connecting a spring 16 to the block 43, is approximately two and one eighth inches. A bolt and cooperating nut (not shown) are used to connect the spring 16 to the block, through the aperture 52. The angular dimension D is approximately 25°. The bracket is advantageously composed of 304 stainless steel.

From the foregoing, it will observed that numerous modifications and variations can be effected without departing from the spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A vibrating device for moving material, comprising:
    a trough having a bottom wall and side walls, an edge defined between each of said side walls and said bottom wall;
    a base arranged parallel to said trough;
    a vibrator mounted to said base to vibrate said base;
    a plurality of leaf springs spaced apart along a length of said trough and arranged along both of said side walls, each leaf spring extending from said base to said trough, said leaf springs each connected at one end to said base and at an opposite end to said trough at one of a plurality of reinforced connections; and
    said reinforced connections each including an L-shaped bracket plate welded to one of said side walls and to said bottom wall, closely fitting over said edge defined by said one side wall and said bottom wall, and a spring-mounting block fastened to said spring mounting bracket and to said leaf spring.

2. The device according to claim 1, wherein said spring mounting block is tilted to the vertical direction and said leaf spring connected thereto is tilted to the vertical direction to flushly mate with said spring mounting block.

3. The device according to claim 1, wherein said spring-mounting block comprises a hole therethrough for bolt connection to said leaf spring connected thereto.

4. An elongate trough supported on a plurality of springs extending from a base, comprising:
    a sheet metal bottom wall and sheet metal sidewalls connected thereto and extending upwardly and longitudinally of the trough, said bottom wall and said sidewalls forming a U-shape;
    a plurality of spring support brackets, each having a vertical leg and a horizontal leg which are connected repectively to one of said sidewalls and said bottom wall, each said bracket having a spring mounting block extending therefrom and being connectable to one of the plurality of springs, said horizontal leg resisting bending stress within said bottom wall and said vertical leg resisting shear stress in said respective one sidewall.

5. The trough according to claim 4, wherein said spring mounting block is tilted to the vertical direction and the spring connected thereto is tilted to the vertical direction to flushly mate with said spring mounting block.

6. The trough according to claim 4, wherein said spring-mounting block comprises a hole therethrough for bolt connection to the spring connected thereto.

7. The trough according to claim 4 wherein each said bracket is welded to said respective one sidewall and to said bottom wall.

8. The device according to claim 1, wherein said spring mounting block is tilted to the vertical direction and said leaf spring connected thereto is tilted to the vertical direction to flushly mate with said spring mounting block, and wherein said spring-mounting block comprises a hole therethrough for bolt connection to said leaf spring connected thereto.

9. The trough according to claim 4, wherein said spring mounting block is tilted to the vertical direction and the spring connected thereto is tilted to the vertical direction to flushly mate with said spring mounting block, wherein said spring-mounting block comprises a hole therethrough for bolt connection to the spring connected thereto, wherein each said bracket is welded to said respective one sidewall and to said bottom wall.

* * * * *